(12) United States Patent
Cook et al.

(10) Patent No.: US 11,410,136 B2
(45) Date of Patent: Aug. 9, 2022

(54) PROCUREMENT SYSTEM USING BLOCKCHAIN

(71) Applicant: American Express Travel Related Services Company, Inc., New York, NY (US)

(72) Inventors: Jane E. Cook, Mountain Lakes, NJ (US); Andras L. Ferenczi, Peoria, AZ (US); Nat Grauman, Maplewood, NJ (US); Nilesh Y. Jadhav, Phoenix, AZ (US); Harish R. Naik, Phoenix, AZ (US); Rosa W. Tang, Glen Rock, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 304 days.

(21) Appl. No.: 16/052,416

(22) Filed: Aug. 1, 2018

(65) Prior Publication Data
US 2020/0042960 A1 Feb. 6, 2020

(51) Int. Cl.
*G06Q 20/00* (2012.01)
*G06Q 20/06* (2012.01)
*G06Q 20/38* (2012.01)
*H04L 9/00* (2022.01)
(Continued)

(52) U.S. Cl.
CPC ....... *G06Q 20/065* (2013.01); *G06F 16/1805* (2019.01); *G06F 16/27* (2019.01); *G06Q 20/3829* (2013.01); *H04L 9/006* (2013.01); *H04L 2209/38* (2013.01)

(58) Field of Classification Search
CPC .. G06Q 20/065; G06Q 20/3829; G06F 16/27; G06F 16/1805; H04L 9/006
See application file for complete search history.

(56) References Cited

U.S. PATENT DOCUMENTS 6,816,839 B1 * 11/2004 Gung ............... G06Q 10/06
 705/7.31
8,156,012 B1 * 4/2012 Eisner ............. G06Q 30/0635
 705/26.81
(Continued)

FOREIGN PATENT DOCUMENTS

WO WO-2018163044 A1 * 9/2018 ........... G06Q 20/065

OTHER PUBLICATIONS

LoadDelivered, Why Blockchain is a Game Changer for Supply Chain Management, Jan. 28, 2016, LoadDelivered (Year: 2016).*
(Continued)

*Primary Examiner* — Patrick McAtee
*Assistant Examiner* — Terry N Murray
(74) *Attorney, Agent, or Firm* — Thomas | Horstemeyer, LLP

(57) ABSTRACT

A procurement system and process using blockchain is disclosed. The procurement system may facilitate procurement reconciliation between procurement initiators, clients, suppliers, and/or transaction processors, using blockchain. Each party may comprise a blockchain node configured to interact with a procurement blockchain. The procurement process may be controlled by a billing smart contract and a client smart contract configured to enforce data workflows and establish trust between the parties.

20 Claims, 2 Drawing Sheets

Figure 1:
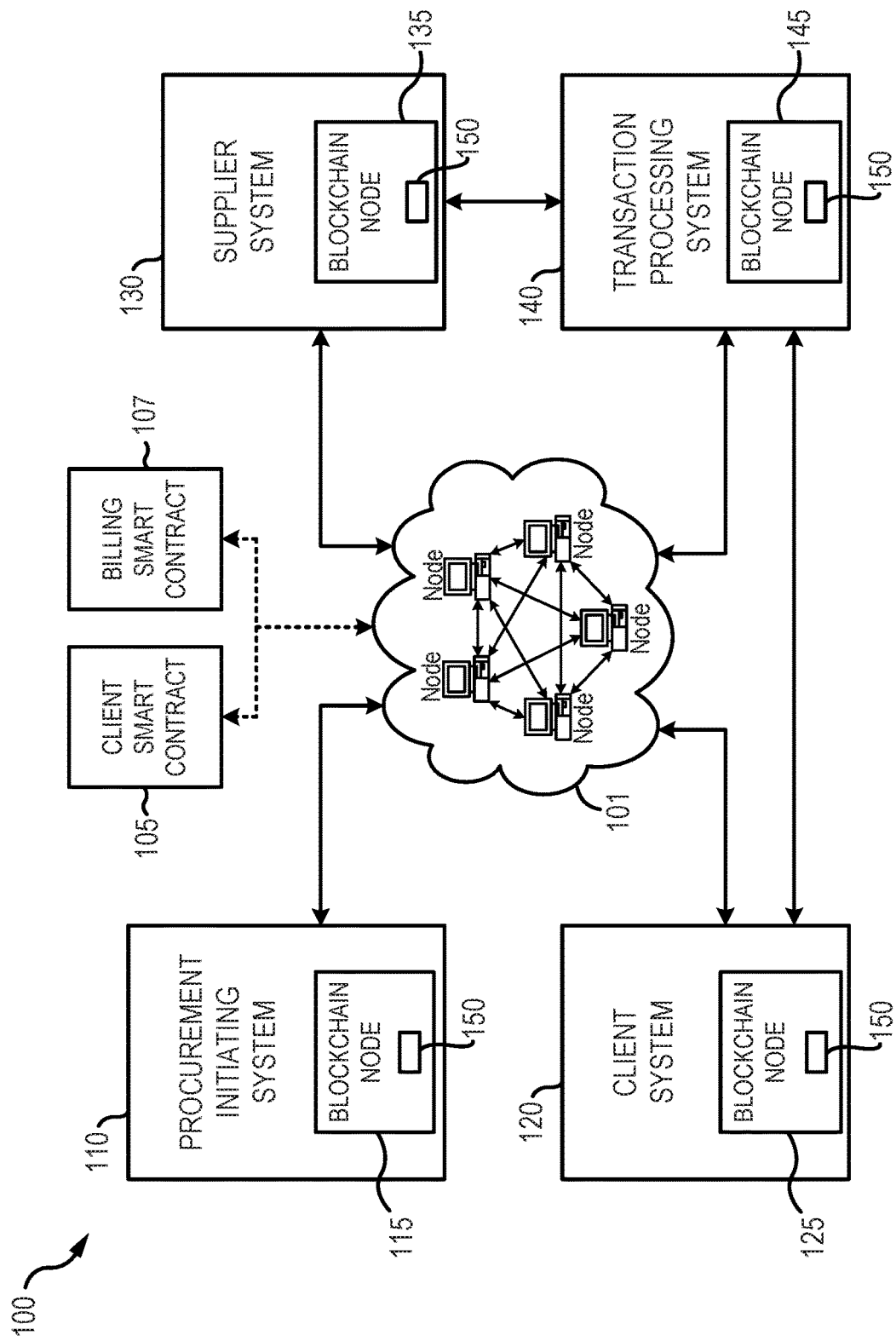

(51) Int. Cl.
*G06F 16/27* (2019.01)
*G06F 16/18* (2019.01)

(56) References Cited

U.S. PATENT DOCUMENTS

| | | | |
|---|---|---|---|
| 2002/0099580 A1* | 7/2002 | Eicher, Jr. | G06Q 30/0607 705/26.25 |
| 2002/0133387 A1* | 9/2002 | Wilson | G06Q 10/08 705/338 |
| 2002/0143598 A1* | 10/2002 | Scheer | G06Q 10/06 705/7.26 |
| 2004/0030611 A1* | 2/2004 | Byrne | G06Q 30/0635 705/26.2 |
| 2013/0080200 A1* | 3/2013 | Connolly | G06Q 10/08 705/7.12 |
| 2013/0117087 A1 | 5/2013 | Coppinger | |
| 2016/0292680 A1 | 6/2016 | Wilson, Jr. et al. | |
| 2016/0342989 A1 | 11/2016 | Davis | |
| 2016/0345978 A1 | 12/2016 | Cruise | |
| 2017/0048209 A1 | 2/2017 | Lohe et al. | |
| 2017/0091740 A1 | 3/2017 | Maim | |
| 2017/0109735 A1 | 4/2017 | Sheng et al. | |
| 2017/0230189 A1 | 8/2017 | Toll et al. | |
| 2017/0232300 A1 | 8/2017 | Tran et al. | |
| 2017/0372300 A1 | 12/2017 | Dunlevy et al. | |
| 2018/0006826 A1 | 1/2018 | Smith | |
| 2018/0075453 A1* | 3/2018 | Durvasula | G06Q 20/10 |
| 2018/0197173 A1* | 7/2018 | Durvasula | G06Q 20/209 |
| 2018/0268386 A1* | 9/2018 | Wack | H04L 9/085 |
| 2018/0365201 A1* | 12/2018 | Hunn | G06F 17/2247 |
| 2018/0365764 A1* | 12/2018 | Nelson | G06Q 40/025 |
| 2019/0108576 A1* | 4/2019 | LaPrade | G06Q 30/0635 |
| 2019/0130484 A1* | 5/2019 | de Jong | G06Q 20/02 |
| 2019/0279136 A1* | 9/2019 | Gershenson | G06F 16/27 |
| 2019/0394179 A1* | 12/2019 | Androulaki | H04L 63/0471 |
| 2020/0014720 A1* | 1/2020 | Giura | H04L 63/20 |
| 2020/0027005 A1* | 1/2020 | Harrison | H04L 9/085 |

OTHER PUBLICATIONS

Yorke Rhodes III, Can Blockchain secure supply chains, improve operations and solve humanitarian issues, Jan. 18, 2017, Azure Blockchain Engineering, (Year: 2017).*
Robert Mitchell, End to End Supply Chain, Apr. 2018, asq.org (Year: 2018).*
"Smart Contracts", Chamber of Digital Commerce, Smart Contracts Alliance, Sep. 2018 (Year: 2018).*
Internatinal Search Report and Written Opinion PCT Serial No. PCT/US2018/059670 dated Jan. 25, 2019.
Non-Final Office Action dated May 13, 2019 in U.S. Appl. No. 15/266,350.
Sastry Durvasula, et al., U.S. Appl. No. 15/266,350, filed Sep. 15, 2016, titled "Systems and Methods for Blockchain Based Payment Networks," 44 pages.
Sastry Durvasula, et al., U.S. Appl. No. 15/405,123, filed Jan. 12, 2017, titled "Systems and Methods for Blockchain Based Proof of Payment," 37 pages.
Balaji Balaraman, et al., U.S. Appl. No. 15/824,513, filed Nov. 28, 2017, titled "Transaction Authorization Process Using Blockchain," 48 pages.
Balaji Balaraman, et al., U.S. Appl. No. 15/943,168, filed Apr. 2, 2018, titled "Transaction Process using Blockchain Token Smart Contracts."
Andras L Ferenczi, et al., U.S. Appl. No. 16/012,598, filed Jun. 19, 2018, tilted "Buyer-Centric Marketplace Using Blockchain".
Alaric M Eby, et al. U.S. Appl. No. 16/051,126, filed Jul. 31, 2018, and titled "System and Method for Transaction Account Based Micropayments".
Final Office Action dated Sep. 11, 2019 in U.S. Appl. No. 15/266,350.
Internatinal Search Report and Written Opinion PCT Serial No. PCT/US2019/022791 dated Jun. 6, 2019.
Restriction Office Action dated Aug. 6, 2019 in U.S. Appl. No. 15/405,123.

* cited by examiner

PROCUREMENT SYSTEM USING BLOCKCHAIN

FIELD

This disclosure generally relates to a procurement system, and more particularly, to procurement systems and processes using a distributed ledger.

BACKGROUND

Corporate entities may utilize a corporate transaction account for procuring items. The corporate entity may comprise various subgroups, departments, or the like, and each subgroup may use the corporate transaction account to procure items. The total cost of procurements may be reconciled and divided accordingly amongst the corresponding subgroups. The procurement reconciliation process may be complex and may involve multiple parties that need to participate in the process, including entity subgroups, various clients, intermediary clients, suppliers, and transaction processing entities. Additionally, in order to reconcile various procurements, additional data typically needs to be gathered to determine the subgroup that originated the procurement.

A technical problem is that processing the large amounts of data ingested during the procurement reconciliation process is very memory intensive. Moreover, due at least partially to the large amounts of data being processed across multiple entities (which may also involve manual data review), typical procurement processes are not completed in real time (or near real time) and may delay reconciliation, expense reporting, and/or procurement payments.

SUMMARY

Systems, methods, and computer readable mediums (collectively, the "system") for procurement systems using blockchain are disclosed. The system may include a billing smart contract hosted in a blockchain network and configured to perform various operations. The billing smart contract may generate a purchase order based on a purchase requisition request received from a procurement initiating system; transmit the purchase order to a client system, wherein in response to receiving the purchase order the client system is configured to transmit a procurement order to a supplier system, and wherein the supplier system is configured to transmit a procurement charge to a transaction processing system; receive a proof of purchase from a supplier system; receive a proof of payment from the transaction processing system; and write the proof of purchase and the proof of payment to a procurement blockchain.

In various embodiments, the billing smart contract may also be configured to generate a procurement billing notification; and transmit the procurement billing notification to the client system, wherein in response to receiving the procurement billing notification the client system is configured to process a payment based on the procurement billing notification. The billing smart contract may also be configured to receive a procurement record of payment from the client system, wherein the procurement record of payment comprises proof of the payment based on the procurement billing notification; and write the procurement record of payment to the procurement blockchain. The billing smart contract may also be configured to adjust at least one of a client account balance or a supplier account balance on the procurement blockchain based on the procurement record of payment.

In various embodiments, the billing smart contract may also be configured to invoke a client smart contract, wherein in response to being invoked the client smart contract is configured to validate the proof of purchase and the proof of payment.

In various embodiments, in response to receiving the procurement charge the transaction processing system is configured to authorize the procurement charge and transmit a procurement charge authorization to the supplier system. The transaction processing system may be configured to process the procurement charge and generate the proof of payment based on the processed procurement charge.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein like numerals denote like elements.

Figure 2:
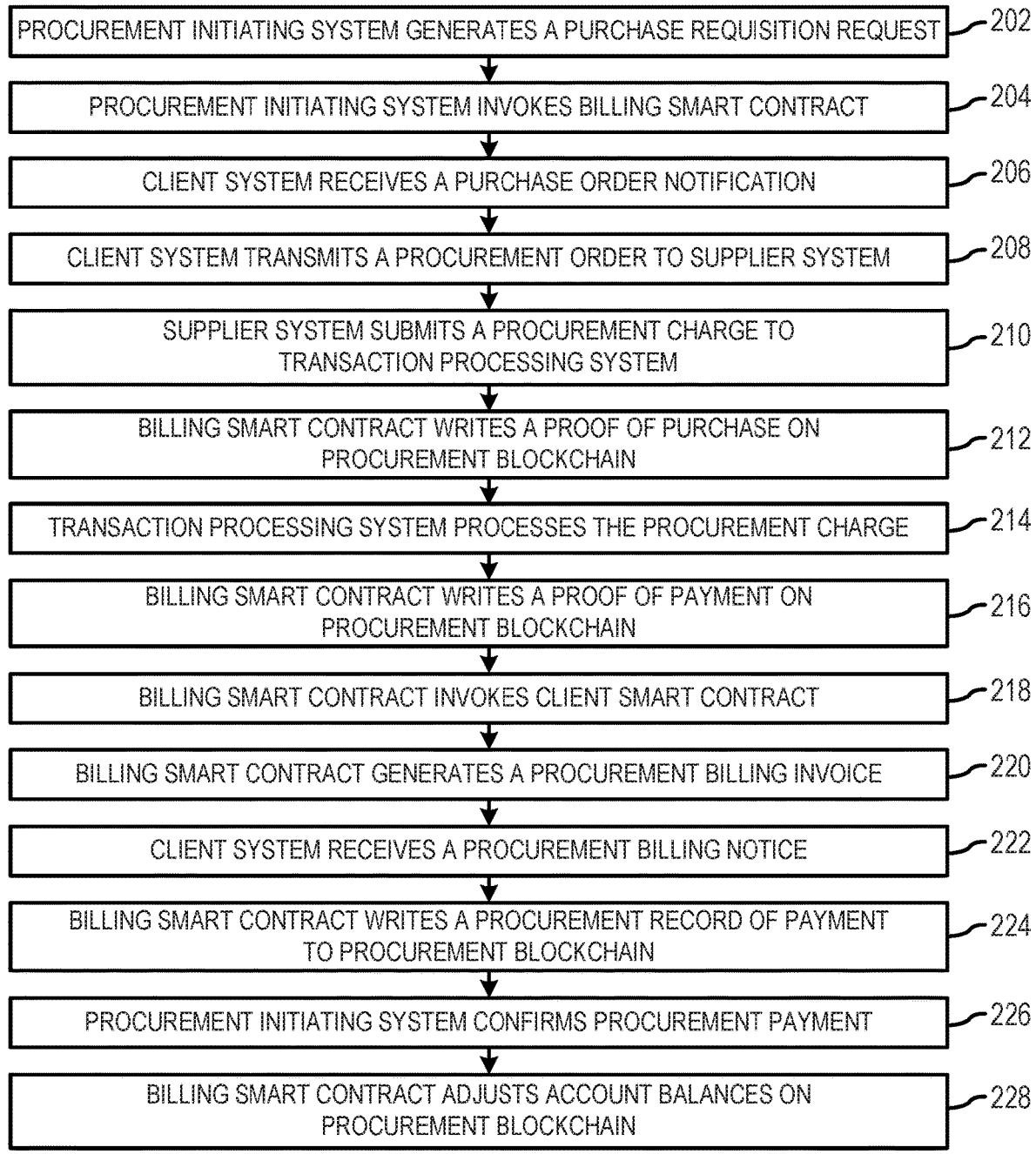

FIG. 1 is an exemplary block diagram illustrating a procurement system, in accordance with various embodiments; and FIG. 2 illustrates an exemplary process flow for initiating a procurement in the procurement system, in accordance with various embodiments.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used herein, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

The procurement system may be used to facilitate a procurement reconciliation process between various entities using blockchain. For example, the procurement system may facilitate procurement transactions and reconciliations between one or more procurement initiators, clients, suppliers, and/or transaction processors. The procurement initiator (e.g., a procurement imitating system) may comprise any entity, sub-entity or department of the entity, or the like desiring to procure goods or services through the procurement system. The client (e.g., a client system) may comprise an end client of the procurement initiator, an intermediary client of one or more end clients, and/or the like that offers various products and/or services. For example, wherein the procurement initiator desires to procure laptops, the client may comprise an electronic goods and/or services entity, such as BEST BUY®, FRY'S ELECTRONICS®, AMAZON®, etc. The supplier (e.g., a supplier system) may comprise a supplier, merchant, and/or the like offering one or more products or services. For example, the client may comprise an electronic goods entity, and the supplier may comprise a merchant offering laptops, such as, for example, DELL®, TOSHIBA®, APPLE®, etc. The transaction processor (e.g., a transaction processing system) may comprise a payment processor, bank, financial institution, transaction network, issuer system, or the like capable of processing payments and transactions. For example, exemplary transaction processors may include AMERICAN EXPRESS®, MASTERCARD®, PAYPAL®, VISANET®, WELLS FARGO®, etc.

Each party may comprise a blockchain node, API, or the like configured to enable the party to interact with a procurement blockchain. The parties may write and retrieve data to the procurement blockchain to initiate and complete procurements, as discussed further herein. The procurement system may use smart contracts to enforce the data workflows and rules, and to establish trust between the parties. In that regard, the end-to-end procurement process may be captured on the procurement blockchain, which may simplify and enhance auditing and reconciliation of the procurement process. Further, any two entities on the system can also initiate a procurement process without the need of a special setup, software, or additional hardware.

The systems, methods, and computer readable mediums (collectively, the "system") described herein, in accordance with various embodiments, may use a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers (e.g., buying requests, seller quotes, financing products, buyer orders, financing product confirmations, etc.) performed through the system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times and the speed of transferring data, initiating purchases, and completing purchases in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of buying requests and purchases by performing cryptographic processes on data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. Further, by syncing data with the involved parties in real time (or near real time), the system may improve data integrity, data confidentiality, and data security, which may also improve the speed of the business process. The system also offers increased reliability and fault tolerance over traditional databases (e.g., relational databases, distributed databases, etc.) as each node may operate with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No.

15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, and U.S. application Ser. No. 16/012,598 titled BUYER-CENTRIC MARKETPLACE USING BLOCKCHAIN and filed on Jun. 19, 2018, the contents of which are each incorporated by reference in its entirety.

This system improves the functioning of the computer and provides a technical solution to the technical problem of memory, computing, and storage requirements typically needed to reconcile procurements. For example, by recording steps of the procurement process in real time (or near real time) using a blockchain, reconciliation may be completed in real time (or near real time) and without the need to bring in additional data to identify procurements. By at least partially decreasing the data needed to reconcile procurements, and reducing the need for manual review, the system may decrease CPU, memory, and data storage requirements, which saves on data storage and memory which speeds processing. Additionally, by transmitting, storing, and accessing data using the processes described herein, the security of the data is improved, which decreases the risk of the computer or network from being compromised. In various embodiments, use of the blockchain network may also enable secure transactions amongst the parties. For example, the system may enable transmissions written to the blockchain to be visible to only the participants involved in the procurement. As a further example, this may be achieved through a zero-knowledge proof method, such as zk-SNARKs.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, messages, data for storage, and the like in digital or any other form.

With reference to FIG. 1, a procurement system 100 is depicted according to various embodiments. System 100 may include various computing devices, software modules, networks, and data structures in communication with one another. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing. System 100 based on a blockchain, as described herein, may simplify and automate reward points transfers and related processes by using the blockchain as a distributed and tamper-proof data store. Transparency is very high for various embodiments using a federated or public blockchain since validation is performed, for example, using data stored by a decentralized autonomous organization (DAO) instead of a specific financial institution.

In various embodiments, system 100 may comprise a procurement initiating system 110, a client system 120, a supplier system 130, a transaction processing system 140, and/or a blockchain network 101. Blockchain network 101 may be in electronic communication with procurement initiating system 110, client system 120, supplier system 130, and/or transaction processing system 140, via one or more blockchain nodes, as discussed further herein. Blockchain network 101 may be a blockchain network or peer-to-peer network that is private, consortium and/or public in nature (e.g., ETHEREUM®, Bitcoin, HYPERLEDGER® Fabric, etc.). Consortium and private networks may offer improved control over the content of the blockchain and public networks may leverage the cumulative computing power of the network to improve security. The blockchain network 101 may comprise various blockchain nodes in electronic communication with each other, as discussed further herein.

In various embodiments, blockchain network 101 may host and/or implement one or more smart contracts. The smart contracts may control the end-to-end data flow in system 100 and may autonomously govern the procurement process by supporting execution and recording of various procurement data. For example, and in accordance with various embodiments, blockchain network 101 may host one or more client smart contracts 105 and/or one or more billing smart contracts 107. Client smart contract 105 and/or billing smart contract 107 may comprise executables that write data to procurement blockchain 150 in a predetermined format based on predetermined function parameters passed by an API call or the like, as discussed further herein. Client smart contract 105 and/or billing smart contract 107 may include a program written in a programming language such as, for example, Solidity, or any other suitable smart contract programming language.

In various embodiments, billing smart contract 107 may be configured to control the procurement workflow, write data to procurement blockchain 150, transmit notifications to one or more entities, and/or the like, as discussed further herein. For example, and as discussed further herein, billing smart contract 107 may be configured to write procurement proof of purchases, procurement proof of payments, procurement record of payments, or the like to procurement blockchain 150. Billing smart contract 107 may be configured to generate purchase order notifications, billing notifications, and/or the like. Billing smart contract 107 may also be configured to maintain and adjust account balances throughout the procurement process.

In various embodiments, client smart contract 105 may be used as an optional validation process configurable by individual procurement initiating systems 110. For example, one or more procurement initiating system 110 may configure one or more client smart contracts 105 to ensure proper validation as required or desired by the corresponding procurement initiating system 110. Client smart contract 105 may be invoked at any point in the procurement process. Client smart contract 105 may be configured to validate purchases and payments during the procurement process based on the purchase requisition request from procurement initiating system 110. For example, client smart contract 105 may be configured to retrieve proof of purchases and corresponding proof of payments from procurement blockchain 150, and validate the proof of purchases and corresponding proof of payments based on client specifications. Client smart contract 105 may be configured to validate that the time or date of procurement is within a predefined time range, limit or the like; that the total price does not exceed a predefined value; and/or the like. In response to client smart contract 105 failing to validate data, client smart contract 105 may be configured to initiate a transaction rollback process, as discussed further herein.

In various embodiments, procurement initiating system 110 may enable a user (e.g., a procurement initiator) to initiate a purchase requisition request to begin the procurement process. The purchase requisition request may comprise a procurement request (e.g., "500 laptops"), a specified client (e.g., client system 120), and/or any other suitable data or parameters customizing the procurement request. Procurement initiating system 110 may invoke billing smart contract 107 to begin the procurement process.

Procurement initiating system 110 may be in electronic communication with blockchain network 101. Procurement initiating system 110 may comprise any suitable combination of hardware, software, and/or database components. For example, procurement initiating system 110 may comprise at least one computing device in the form of a computer or processor, or a set of computers/processors, although other types of computing units or systems may be used, such as, for example, a server, web server, pooled servers, or the like. Procurement initiating system 110 may also include one or more data centers, cloud storages, or the like, and may include software, such as APIs, configured to retrieve and write data to the blockchain. In various embodiments, procurement initiating system 110 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Procurement initiating system 110 may comprise various components configured to allow procurement initiating system 110 to interact with blockchain network 101. For example, procurement initiating system 110 may comprise a user terminal providing a user interface (UI). The UI may comprise software, a web page, or the like, and may be accessible via a web browser (e.g., GOOGLE CHROME®, MICROSOFT INTERNET EXPLORER®, etc.), a mobile application (e.g., downloaded via APPLE® APP STORE®, GOOGLE PLAY®, etc.), or the like on the user terminal. The UI may enable a user, via the user terminal, to submit data and requests to blockchain network 101, as discussed further herein.

Procurement initiating system 110 may also comprise various application programming interfaces (API), software development kits (SDK), software, services, interfaces, and the like configured to enable communications between procurement initiating system 110 (and/or procurement initiating system 110 subsystems or components) and procurement initiation system (PIS) blockchain node 115. For example, procurement initiating system 110 may comprise programmatic libraries configured to translate and transmit queries and commands from the user terminal and/or the UI to PIS blockchain node 115. The APIs, SDKs, software, services, or the like may translate requests received by PIS blockchain node 115 into a blockchain format (which may include digital signing using procurement initiation system-specific security certificates). In that respect, procurement initiating system 110 may be configured to store and maintain one or more procurement initiation system-specific cryptographic keys used to perform cryptographic operations. As a further example, and in accordance with various embodiments, the APIs, SDKs, software, services, or the like may be configured to translate data retrieved from procurement blockchain 150 into a format readable by procurement initiating system 110, which may include digital signature verification and/or data transformation from a blockchain specific data layout to an application specific data layout. Procurement initiating system 110 may include a blockchain oracle configured to generate one or more notifications in response to data being written to procurement blockchain 150. For example, the blockchain oracle may be configured to query PIS blockchain node 115 at a defined interval to search for new writes to procurement blockchain 150. The blockchain oracle may be controlled by notification triggers containing filters indicating the types of data written to procurement blockchain 150 that will generate a notification.

In various embodiments, PIS blockchain node 115 may be in electronic communication with one or more other blockchain nodes in blockchain network 101. PIS blockchain node 115 may be configured to allow procurement initiating system 110 access to blockchain network 101 and/or procurement blockchain 150. PIS blockchain node 115 may be configured to maintain a copy (or partial copy) of procurement blockchain 150, write and/or retrieve data and blocks from procurement blockchain 150, validate blocks of procurement blockchain 150, and/or propagate writes to procurement blockchain 150 to blockchain network 101, as discussed further herein. PIS blockchain node 115 may communicate with one or more blockchain nodes (e.g., client system blockchain node 125, supplier system blockchain node 135, TPS blockchain node 145, etc.) to validate and write blocks to procurement blockchain 150, and to establish consensus between the blockchain nodes. For example, the blockchain nodes may establish consensus based on proof of work, proof of stake, practical byzantine fault tolerance, delegated proof of stake, or other suitable consensus algorithms.

PIS blockchain node 115 may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. PIS blockchain node 115 may run applications to interact with procurement blockchain 150, communicate with other devices, perform crypto operations, and otherwise operate within procurement initiating system 110. For example, PIS blockchain node 115 may run a client application that can be a thin client (web), a hybrid (e.g., web and native, such as APPLE® iOS and ANDROID®), or a native application to make application programming interface (API) calls to interact with procurement blockchain 150, such as a web3 API compatible with blockchain databases maintained by ETHEREUM®.

In various embodiments, procurement blockchain 150 may be a distributed ledger that maintains records in a readable manner and that is resistant to tampering. Procurement blockchain 150 may be based on blockchain technologies such as, for example, ETHEREUM®, Open Chain, Chain Open Standard, HYPERLEDGER® Fabric, CORDA CONNECT®, INTEL® Sawtooth, etc. Procurement blockchain 150 may comprise a ledger of interconnected blocks containing data. Each block may link to the previous block and may include a timestamp. Each block may hold one or more purchase requisition requests, purchase order notifications, procurement proof of purchases, procurement poof of payments, procurement records of payment, procurement payment confirmations, account balances, or the like. When implemented in support of system 100, procurement blockchain 150 may serve as an immutable log of procurements and transactions in system 100. Procurement blockchain 150 may be maintained on various blockchain nodes (e.g., PIS blockchain node 115, client system blockchain node 125, supplier system blockchain node 135, TPS blockchain node 145, etc., etc.) in the form of copies or partial copies of the procurement blockchain 150, as discussed further herein. Blocks (e.g., including purchase requisition requests, purchase order notifications, procurement proof of purchases, procurement poof of payments, procurement records of payment, procurement payment confirmations, account balances, etc.) may be written to procurement blockchain 150 by establishing consensus between the blockchain nodes. For example, consensus may be established based on proof of work, proof of stake, practical byzantine fault tolerance, delegated proof of stake, or other suitable consensus algorithms.

Although the present disclosure makes reference to procurement initiating system 110, it should be understood that principles of the present disclosure may be applied to a system 100 having any suitable number of procurement initiating systems 110 interconnected to blockchain network 101.

In various embodiments, client system 120 may be configured to receive and process purchase order notifications, transmit procurement orders to one or more supplier systems 130, transmit procurement order payments, and/or the like. Client system 120 may comprise a recursive client list comprising relationships amongst one or more client systems 120 (e.g., end clients, intermediary clients, etc.) to aid in the flow of procurement orders. Client system 120 may be in electronic communication with blockchain network 101 and/or transaction processing system 140. Client system 120 may comprise any suitable combination of hardware, software, and/or database components. For example, client system 120 may comprise at least one computing device in the form of a computer or processor, or a set of computers/processors, although other types of computing units or systems may be used, such as, for example, a server, web server, pooled servers, or the like. Client system 120 may also include one or more data centers, cloud storages, or the like, and may include software, such as APIs, configured to retrieve and write data to the blockchain. In various embodiments, client system 120 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Client system 120 may comprise various components configured to allow client system 120 to interact with blockchain network 101. For example, client system 120 may comprise a user terminal providing a user interface (UI). The UI may comprise software, a web page, or the like, and may be accessible via a web browser (e.g., GOOGLE CHROME®, MICROSOFT INTERNET EXPLORER®, etc.), a mobile application (e.g., downloaded via APPLE® APP STORE®, GOOGLE PLAY®, etc.), or the like on the user terminal. The UI may enable a user (e.g., a client coordinator, etc.), via the user terminal, to submit data and requests to blockchain network 101, as discussed further herein.

Client system 120 may also comprise various application programming interfaces (API), software development kits (SDK), software, services, interfaces, and the like configured to enable communications between client system 120 (and/or client system 120 subsystems or components) and client system blockchain node 125. For example, client system 120 may comprise programmatic libraries configured to translate and transmit queries and commands from the user terminal and/or the UI to client system blockchain node 125. The APIs, SDKs, software, services, or the like may translate requests received by client system blockchain node 125 into a blockchain format (which may include digital signing using client system-specific security certificates). In that respect, client system 120 may be configured to store and maintain one or more client system-specific cryptographic keys used to perform cryptographic operations. As a further example, and in accordance with various embodiments, the APIs, SDKs, software, services, or the like may be configured to translate data retrieved from procurement blockchain 150 into a format readable by client system 120, which may include digital signature verification and/or data transformation from a blockchain specific data layout to an application specific data layout. Client system 120 may include a blockchain oracle configured to generate one or more notifications in response to data being written to procurement blockchain 150. For example, the blockchain oracle may be configured to query client system blockchain node 125 at a defined interval to search for new writes to procurement blockchain 150. The blockchain oracle may be controlled by notification triggers containing filters indicating the types of data written to procurement blockchain 150 that will generate a notification.

In various embodiments, client system 120 may comprise a client system blockchain node 125. Client system blockchain node 125 may be in electronic communication with one or more other blockchain nodes in blockchain network 101. Client system blockchain node 125 may be configured to allow client system 120 access to blockchain network 101 and/or procurement blockchain 150. Client system blockchain node 125 may be configured to maintain a copy (or partial copy) of procurement blockchain 150, write to and/or retrieve data and blocks from procurement blockchain 150, validate blocks of procurement blockchain 150, and/or propagate writes to procurement blockchain 150 to blockchain network 101, as discussed further herein. Client system blockchain node 125 may communicate with one or more blockchain nodes (e.g., PIS blockchain node 115, supplier system blockchain node 135, TPS blockchain node 145, etc.) to validate and write blocks to procurement blockchain 150, and to establish consensus between the blockchain nodes. For example, the blockchain nodes may establish consensus based on proof of work, proof of stake, practical byzantine fault tolerance, delegated proof of stake, or other suitable consensus algorithms.

Client system blockchain node 125 may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. Client system blockchain node 125 may run applications to interact with procurement blockchain 150, communicate with other devices, perform crypto operations, and otherwise operate within client system 120. For example, client system blockchain node 125 may run a client application that can be a thin client (web), a hybrid (e.g., web and native, such as APPLE® iOS and ANDROID®), or a native application to make application programming interface (API) calls to interact with procurement blockchain 150, such as a web3 API compatible with blockchain databases maintained by ETHEREUM®.

Although the present disclosure makes reference to client system 120, it should be understood that principles of the present disclosure may be applied to a system 100 having any suitable number of client systems 120 interconnected to blockchain network 101. For example, system 100 may include one or more end client systems, intermediary client systems, or the like.

In various embodiments, supplier system 130 may be configured to receive procurement orders from client system 120, process and complete the procurement orders, transmit procurement charges to transaction processing system 140, transmit a record of purchase to billing smart contract 107, and/or the like, as discussed further herein. Supplier system 130 may be in electronic communication with blockchain network 101 and/or transaction processing system 140. Supplier system 130 may comprise any suitable combination of hardware, software, and/or database components. For example, supplier system 130 may comprise at least one computing device in the form of a computer or processor, or a set of computers/processors, although other types of computing units or systems may be used, such as, for example, a server, web server, pooled servers, or the like. Supplier system 130 may also include one or more data centers, cloud storages, or the like, and may include software, such as APIs, configured to retrieve and write data to the blockchain. In various embodiments, supplier system 130 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Supplier system 130 may comprise various components configured to allow supplier system 130 to interact with blockchain network 101. For example, supplier system 130 may comprise a user terminal providing a user interface (UI). The UI may comprise software, a web page, or the like, and may be accessible via a web browser (e.g., GOOGLE CHROME®, MICROSOFT INTERNET EXPLORER®, etc.), a mobile application (e.g., downloaded via APPLE® APP STORE®, GOOGLE PLAY®, etc.), or the like on the user terminal. The UI may enable a user (e.g., a consultant, merchant, supplier, etc.), via the user terminal, to submit data and requests to blockchain network 101, as discussed further herein.

Supplier system 130 may also comprise various application programming interfaces (API), software development kits (SDK), software, services, interfaces, and the like configured to enable communications between supplier system 130 (and/or supplier system 130 subsystems or components) and supplier system blockchain node 135. For example, supplier system 130 may comprise programmatic libraries configured to translate and transmit queries and commands from the user terminal and/or the UI to supplier system blockchain node 135. The APIs, SDKs, software, services, or the like may translate requests received by supplier system blockchain node 135 into a blockchain format (which may include digital signing using supplier system-specific security certificates). In that respect, supplier system 130 may be configured to store and maintain one or more supplier system-specific cryptographic keys used to perform cryptographic operations. As a further example, and in accordance with various embodiments, the APIs, SDKs, software, services, or the like may be configured to translate data retrieved from procurement blockchain 150 into a format readable by supplier system 130, which may include digital signature verification and/or data transformation from a blockchain specific data layout to an application specific data layout. Supplier system 130 may include a blockchain oracle configured to generate one or more notifications in response to data being written to procurement blockchain 150. For example, the blockchain oracle may be configured to query supplier system blockchain node 135 at a defined interval to search for new writes to procurement blockchain 150. The blockchain oracle may be controlled by notification triggers containing filters indicating the types of data written to procurement blockchain 150 that will generate a notification.

In various embodiments, supplier system 130 may comprise a supplier system blockchain node 135. Supplier system blockchain node 135 may be in electronic communication with one or more other blockchain nodes in blockchain network 101. Supplier system blockchain node 135 may be configured to allow supplier system 130 access to blockchain network 101 and/or procurement blockchain 150. Supplier system blockchain node 135 may be configured to maintain a copy (or partial copy) of procurement blockchain 150, write to and/or retrieve data and blocks from procurement blockchain 150, validate blocks of procurement blockchain 150, and/or propagate writes to procurement blockchain 150 to blockchain network 101, as discussed further herein. Supplier system blockchain node 135 may communicate with one or more blockchain nodes (e.g., PIS blockchain node 115, client system blockchain node 125, TPS blockchain node 145, etc.) to validate and write blocks to procurement blockchain 150, and to establish consensus between the blockchain nodes. For example, the blockchain nodes may establish consensus based on proof of work, proof of stake, practical byzantine fault tolerance, delegated proof of stake, or other suitable consensus algorithms.

Supplier system blockchain node 135 may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. Supplier system blockchain node 135 may run applications to interact with procurement blockchain 150, communicate with other devices, perform crypto operations, and otherwise operate within supplier system 130. For example, supplier system blockchain node 135 may run a client application that can be a thin client (web), a hybrid (e.g., web and native, such as APPLE® iOS and ANDROID®), or a native application to make application programming interface (API) calls to interact with procurement blockchain 150, such as a web3 API compatible with blockchain databases maintained by ETHEREUM®.

Although the present disclosure makes reference to supplier system 130, it should be understood that principles of the present disclosure may be applied to a system 100 having any suitable number of supplier systems 130 interconnected to blockchain network 101.

In various embodiments, transaction processing system 140 may be configured to receive, process, and complete procurement charges receives from supplier system 130, verify internal systems to complete purchases, and/or the like, as discussed further herein. Transaction processing system 140 may be in electronic communication with blockchain network 101, supplier system 130, and/or client system 120. Transaction processing system 140 may comprise any suitable combination of hardware, software, and/or database components. For example, transaction processing system 140 may comprise at least one computing device in the form of a computer or processor, or a set of computers/processors, although other types of computing units or systems may be used, such as, for example, a server, web server, pooled servers, or the like. Transaction processing system 140 may also include one or more data centers, cloud storages, or the like, and may include software, such as APIs, configured to retrieve and write data to the blockchain. In various embodiments, transaction processing system 140 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, transaction processing system 140 may comprise or interact with a traditional payment network to facilitate purchases and payments, authorize transactions, and/or settle transactions. For example, transaction processing system 140 may represent existing proprietary networks that presently accommodate transactions for credit cards, debit cards, and/or other types of transaction accounts or transaction instruments. Transaction processing system 140 may be a closed network that is secure from eavesdroppers. In various embodiments, transaction processing system 140 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network. Transaction processing system 140 may include systems and databases related to financial and/or transactional systems and processes, such as, for example, one or more authorization engines, authentication engines and databases, settlement engines and databases, accounts receivable systems and databases, accounts payable systems and databases, and/or the like. For example, transaction processing system 140 may authorize and settle payment transactions, and maintain transaction account member databases, accounts receivable databases, accounts payable databases, or the like.

Transaction processing system 140 may comprise various components configured to allow transaction processing system 140 to interact with blockchain network 101. For example, transaction processing system 140 may comprise various application programming interfaces (API), software development kits (SDK), software, services, interfaces, and the like configured to enable communications between transaction processing system 140 (and/or transaction processing system 140 subsystems or components) and transaction processing system (TPS) blockchain node 145. For example, transaction processing system 140 may comprise programmatic libraries configured to translate and transmit queries and commands to TPS blockchain node 145. The APIs, SDKs, software, services, or the like may translate requests received by TPS blockchain node 145 into a blockchain format (which may include digital signing using transaction processing system-specific security certificates). In that respect, transaction processing system 140 may be configured to store and maintain one or more transaction processing system-specific cryptographic keys used to perform cryptographic operations. As a further example, and in accordance with various embodiments, the APIs, SDKs, software, services, or the like may be configured to translate data retrieved from procurement blockchain 150 into a format readable by transaction processing system 140, which may include digital signature verification and/or data transformation from a blockchain specific data layout to an application specific data layout. Transaction processing system 140 may include a blockchain oracle configured to generate one or more notifications in response to data being written to procurement blockchain 150. For example, the blockchain oracle may be configured to query TPS blockchain node 145 at a defined interval to search for new writes to procurement blockchain 150. The blockchain oracle may be controlled by notification triggers containing filters indicating the types of data written to procurement blockchain 150 that will generate a notification.

In various embodiments, transaction processing system 140 may comprise a TPS blockchain node 145. TPS blockchain node 145 may be in electronic communication with one or more other blockchain nodes in blockchain network 101. TPS blockchain node 145 may be configured to allow transaction processing system 140 access to blockchain network 101 and/or procurement blockchain 150. TPS blockchain node 145 may be configured to maintain a copy (or partial copy) of procurement blockchain 150, write to and/or retrieve data and blocks from procurement blockchain 150, validate blocks of procurement blockchain 150, and/or propagate writes to procurement blockchain 150 to blockchain network 101, as discussed further herein. TPS blockchain node 145 may communicate with one or more blockchain nodes (e.g., PIS blockchain node 115, client system blockchain node 125, supplier system blockchain node 135, etc.) to validate and write blocks to procurement blockchain 150, and to establish consensus between the blockchain nodes. For example, the blockchain nodes may establish consensus based on proof of work, proof of stake, practical byzantine fault tolerance, delegated proof of stake, or other suitable consensus algorithms.

TPS blockchain node 145 may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), Internet of things (IoT) devices, or any other device capable of receiving data over a network. TPS blockchain node 145 may run applications to interact with procurement blockchain 150, communicate with other devices, perform crypto operations, and otherwise operate within transaction processing system 140. For example, TPS blockchain node 145 may run a client application that can be a thin client (web), a hybrid (e.g., web and native, such as APPLE® iOS and ANDROID®), or a native application to make application programming interface (API) calls to interact with procurement blockchain 150, such as a web3 API compatible with blockchain databases maintained by ETHEREUM®.

Although the present disclosure makes reference to transaction processing system 140, it should be understood that principles of the present disclosure may be applied to a buyer-centric marketplace system having any suitable number of transaction processing systems interconnected to blockchain network 101.

In various embodiments, a blockchain address may be uniquely assigned to each procurement initiating system 110, client system 120, supplier system 130, and/or transaction processing system 140 to function as a unique identifier in system 100. For example, each procurement initiating system 110, client system 120, supplier system 130, and/or transaction processing system 140 may register with system 100 and/or an existing trust participant (e.g., identity provider), and may be assigned and provided a private key and public key pair. For example, and in accordance with various embodiments, in a permissioned blockchain consortium, each individual participant system (procurement initiating system 110, client system 120, supplier system 130, transaction processing system 140, etc.) will procure a public key and private key pair from a third-party certificate authority (e.g., DigiCert®, VeriSign®, etc.). In a blockchain consortium, one of the participant systems (e.g., procurement initiating system 110, client system 120, supplier system 130, transaction processing system 140, etc.) may initiate and create the blockchain network and may invite (or receive invitation requests from) one or more of the other participants to join the blockchain consortium. Invited participants may accept the request by transmitting a configuration request to join the blockchain consortium. The configuration request may be validated and/or approved by existing participants of the blockchain consortium using digital signature verification. The private key may be stored with each respective procurement initiating system 110, client system 120, supplier system 130, and/or transaction processing system 140, and as discussed further herein, data can be encrypted with the public key prior to writing to procurement blockchain 150.

In response to retrieving data from procurement blockchain 150, the associated procurement initiating system 110, client system 120, supplier system 130, and/or transaction processing system 140 may decrypt the data using the assigned private key. System 100 may generate the public key and private key pair using any suitable key pair generation technique and asymmetric key algorithm. In various embodiments, system 100 may use a Hierarchical Deterministic (HD) solution to enable the creation of one or more child keys from one or more parents keys in a hierarchy. Each child key may be assigned to an individual procurement initiating system 110, client system 120, supplier system 130, and/or transaction processing system 140. For example, system 100 may use BIP32, BIP39, and/or BIP44 to generate an HD tree of public addresses.

The various communications discussed herein may be performed using a network. As used herein, the term "network" may further include any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g., IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, AES, RSA, El Gamal, Schorr signature, DSA, PGP, PM, GPG (GnuPG), and symmetric and asymmetric cryptosystems. Asymmetric encryption in particular may be of use in signing and verifying signatures for blockchain crypto operations.

Referring now to FIG. 2, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIG. 2, but also to the various system components as described above with reference to FIG. 1.

With specific reference to FIG. 2, a procurement process 201 using blockchain is shown according to various embodiments. Procurement initiating system 110 generates a purchase requisition request (step 202). The purchase requisition request may comprise a procurement request (e.g., "500 laptops"), one or more specified clients (e.g., client system 120), and/or any other suitable data or parameters customizing the request (e.g., must be completed in 5 days). Procurement initiating system 110 invokes billing smart contract 107 (step 204). Procurement initiating system 110 may invoke billing smart contract 107 by transmitting the purchase requisition request to PIS blockchain node 115. In response to receiving the purchase requisition request, PIS blockchain node 115 may invoke billing smart contract 107 to begin the procurement process. For example, PIS blockchain node 115 may invoke billing smart contract 107 by passing data to billing smart contract 107, such as, for example the purchase requisition request, data in the purchase requisition request (e.g., the procurement request, the specified client, etc.), and/or the like.

In response to being invoked, billing smart contract 107 may write the purchase requisition request to procurement blockchain 150. In various embodiments, billing smart contract 107 may write the purchase requisition request to include one or more codes relating to the request, such as, for example, a product SKU, a product or service identifier (e.g., "LAP" for laptops, "TEMP" for a temporary employee service, etc.), and the like. In various embodiments, billing smart contract 107 may write parameters regarding the purchase requisition request (e.g., a product or service code, a quantity, a maximum price, etc.). Billing smart contract 107, via PIS blockchain node 115, may propagate the write to at least a second blockchain node (e.g., client system blockchain node 125, supplier system blockchain node 135, TPS blockchain node 145, etc.) in blockchain network 101 for writing to procurement blockchain 150. PIS blockchain node 115 and at least the second blockchain node may consent to the write using any suitable method.

In various embodiments, billing smart contract 107 may generate one or more purchase orders based on the purchase requisition request. For example, wherein the purchase requisition request comprises multiple client systems 120 to complete (e.g., as specified by the purchase requisition request), billing smart contract 107 may generate a purchase order for each client system 120. The purchase order may comprise data indicating the procurement request (e.g., a product or service code, a quantity, the hyperlink to the purchase requisition write on procurement blockchain 150, etc.), and data or parameters customizing the request (e.g., a max time period for fulfilment, a brand specification, a max price, etc.). Billing smart contract 107 may write the one or more purchase orders to procurement blockchain 150. Billing smart contract 107, via PIS blockchain node 115, may propagate the write to at least a second blockchain node (e.g., client system blockchain node 125, supplier system blockchain node 135, TPS blockchain node 145, etc.) in blockchain network 101 for writing to procurement blockchain 150. PIS blockchain node 115 and at least the second blockchain node may consent to the write using any suitable method.

Client system 120 receives a purchase order notification (step 206). In various embodiments, billing smart contract 107 may generate the purchase order notification and transmit the notification to client system 120. In various embodiments, client system 120 may implement a blockchain oracle, API, or the like, and in response to the purchase order being written to procurement blockchain 150, the blockchain oracle, API, or the like may generate the purchase order notification. The purchase order notification may be sent via email, instant message, text, social media posting, website posting, etc. The purchase order notification may comprise the purchase order, a link to the block in procurement blockchain 150 (e.g., as generated during the write to procurement blockchain 150), and/or the like. In response to receiving the purchase order notification, client system 120 may process the purchase order to determine one or more supplier systems 130 to use to complete the request. For example, wherein the purchase order is for 500 laptops, client system 120 may determine one or more supplier systems 130 having inventory totaling the 500 laptops needed to complete the request (e.g., by querying supplier system 130 to determine current inventory of requested goods, services, or the like). Client system 120 transmits a procurement order to supplier system 130 (step 208). The procurement order may comprise the items needed to complete the purchase order. Supplier system 130 may be configured to process the procurement order to determine whether supplier system 130 can complete the procurement order, to determine whether it can complete the order in a requested time frame and to calculate a procurement charge (e.g., the cost of completing the procurement order and a client system identifier).

In various embodiments, in response to client system 120, and/or supplier system 130, being unable to complete the purchase order (e.g., due to a lack of inventory, a lack of supplier system connections, or the like) or in response to billing smart contract 107 specifying an intermediary client (e.g., as previously determined by procurement initiating system 110), client system 120 may transmit a second purchase order notification to the intermediary client (e.g., a second client system). In that respect, steps 206 and 208 may be repeated for each intermediary client.

In various embodiments, in response to processing the procurement order, supplier system 130 submits the procurement charge to transaction processing system 140 (step 210). The procurement charge may be determined based on current prices of specified goods, services, or the like, or based on an agreed-upon price or discount. In response to receiving the procurement charge, transaction processing system 140 may be configured to process the procurement charge. For example, transaction processing system 140 may be configured to authorize the procurement charge. In response to authorizing the procurement charge, transaction processing system 140 may transmit a procurement charge authorization (e.g., a confirmation code, authorization code, etc.) to supplier system 130.

In response to receiving the procurement charge authorization, supplier system 130 may invoke billing smart contract 107 to record a proof of purchase on procurement blockchain 150. The proof of purchase may comprise the procurement order and procurement charge authorization. Supplier system 130 may transmit the proof of purchase to supplier system blockchain node 135. Supplier system blockchain node 135 may invoke billing smart contract 107, and billing smart contract 107 writes the proof of purchase on procurement blockchain 150 (step 212). Billing smart contract 107, via supplier system blockchain node 135, may propagate the write to at least a second blockchain node (e.g., PIS blockchain node 115, client system blockchain node 125, TPS blockchain node 145, etc.) in blockchain network 101 for writing to procurement blockchain 150. Supplier system blockchain node 135 and at least the second blockchain node may consent to the write using any suitable method.

Transaction processing system 140 processes the procurement charge (step 214) in response to authorizing the procurement charge (e.g., in step 210). For example, transaction processing system 140 may be configured to authorize, process, and/or settle the procurement charge using any suitable method, systems, and/or subsystems. In various embodiments, transaction processing system 140 may be configured to provide a real-time status to system 100 and/or individual participants in the procurement transaction. In various embodiments, in response to the procurement charge failing processing, settlement, or the like, transaction processing system 140 may be configured to initiate a transaction rollback process via billing smart contract 107, as discussed further herein. In various embodiments, the procurement charge processing may also be directly integrated into the end-to-end workflow of procurement process 201.

In response to processing the procurement charge, transaction processing system 140 may generate a proof of payment comprising data indicating that the charge was processed successfully. Transaction processing system 140 may transmit the proof of payment to TPS blockchain node 145. TPS blockchain node 145 may invoke billing smart contract 107, and billing smart contract 107 writes the proof of payment on procurement blockchain 150 (step 216). Billing smart contract 107, via TPS blockchain node 145, may propagate the write to at least a second blockchain node (e.g., PIS blockchain node 115, client system blockchain node 125, supplier system blockchain node 135, etc.) in blockchain network 101 for writing to procurement blockchain 150. Supplier system blockchain node 135 and at least the second blockchain node may consent to the write using any suitable method.

Billing smart contract 107 invokes client smart contract 105 (step 218), by passing the proof of purchase and the proof of payment to client smart contract 105. Client smart contract 105 may be configured to validate the proof of purchase and the proof of payment to ensure that the procurement requisition request is being completed as specified. Client smart contract 105 may be configured to validate that the time or date of procurement is within a predefined time range, limit or the like; that the total price does not exceed a predefined value; and/or the like. In response to client smart contract 105 failing to validate data, client smart contract 105 may be configured to initiate a transaction rollback process, as discussed further herein. In response to validating the proof of purchase and the proof of payment, client smart contract 105 may return to billing smart contract 107 a validation notice (e.g., success, failure, etc.).

In response to receiving the validation notice, billing smart contract 107 generates a procurement billing notice (step 220). The procurement billing notice may comprise a client system identifier and the procurement payment amount (e.g., the amount owed by client system 120 to one or more supplier systems 130). In response to a plurality of client systems, intermediary systems or the like, completing the procurement requisition request, billing smart contract 107 may generate a procurement billing notice for each system. Client system 120 receives the procurement billing notice (step 222). Client system 120 may process the procurement billing notice and transmit payment to one or more supplier systems 130 based on the procurement billing notice. In response to completing payment to each supplier system 130, client system 120 may invoke billing smart contract 107, via client system blockchain node 125, to generate a procurement record of payment. Billing smart contract 107 writes the procurement record of payment to procurement blockchain 150 (step 224). Billing smart contract 107, via client system blockchain node 125, may propagate the write to at least a second blockchain node (e.g., PIS blockchain node 115, supplier system blockchain node 135, TPS blockchain node 145, etc.) in blockchain network 101 for writing to procurement blockchain 150. Client system blockchain node 125 and at least the second blockchain node may consent to the write using any suitable method.

In various embodiments, procurement initiating system 110 confirms procurement payment (step 226). For example, procurement initiating system 110 may initiate an API call to PIS blockchain node 115 to invoke billing smart contract 107. PIS blockchain node 115 may invoke billing smart contract 107 to ensure that the proof of purchase, proof of payment, and procurement record of payment were received and successfully recorded on procurement blockchain 150.

Billing smart contract 107 adjusts account balances on procurement blockchain 150 (step 228). In various embodiments, in response to confirming the procurement payment, billing smart contract 107 may adjust the account balance for procurement initiating system 110, one or more client systems 120 (e.g., each end clients and/or intermediary client involved in the procurement process), and/or one or more supplier systems 130 (e.g., each supplier system involved in the procurement process).

In various embodiments, in response to client smart contract 105, billing smart contract 107, client system 120, supplier system 130, or transaction processing system 140 being unable to complete a step of procurement process 201, billing smart contract 107 may be configured to initiate a transaction rollback process. Billing smart contract 107 may be configured to generate a procurement failure notification. For example, in response to client system 120 failing to proceed within a defined time, supplier system 130 not having the needed inventory, or a payment failing in transaction processing system 140, billing smart contract 107 is invoked to notify procurement initiating system 110. As a further example, in response to the payment initiated by client system 120 being rejected by transaction processing system 140, billing smart contract 107 may record a "declined" status (e.g., instead of a proof of purchase). Billing smart contract may notify procurement initiating system 110, client system 120, and/or supplier system 130 of the declined payment to cancel the procurement. The procurement failure notification may comprise data indicating the step of the process that failed, the entity responsible for the failing, and/or any other suitable or desired information.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "user terminal," "user device," or the like may comprise any suitable hardware, software, and/or database components capable of sending, receiving, and storing data. For example, a user terminal may comprise a personal computer, personal digital assistant, cellular phone, smartphone (e.g., IPHONE®, BLACKBERRY®, and/or the like), Internet of things (IoT) device, kiosk, and/or the like. The user terminal may comprise an operating system, such as, for example, a WINDOWS® mobile operating system, an ANDROID® operating system, APPLE® IOS®, a BLACKBERRY® operating system, and the like. The user terminal may comprise software components installed on the user terminal and configured to allow a user access to various system 100 components and systems, as described further herein. For example, the user terminal may comprise a web browser (e.g., MICROSOFT INTERNET EXPLORER®, GOOGLE CHROME®, etc.), an application, a micro-app or mobile application, or the like, configured to allow a user to access and interact with system 100 components and/or systems.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward points, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Any communication, transmission and/or channel discussed herein may include any system or method for delivering content (e.g. data, information, metadata, etc.), and/or the content itself The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, a FACEBOOK® message, a TWITTER® tweet, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, and in accordance with various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, MOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS ®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers Any databases discussed herein may include relational, hierarchical, graphical, blockchain, or object-oriented structure and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MySQL by MySQL AB (Uppsala, Sweden), MONGODB®, REDIS®, APACHE CASSANDRA®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIG. 2, the process flows and screenshots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

The disclosure and claims do not describe only a particular outcome of enabling procurements and requisitions using blockchain, but the disclosure and claims include specific rules for implementing the outcome of procurements and requisitions using blockchain and that render information into a specific format that is then used and applied to create the desired results of enabling procurements and requisitions using blockchain, as set forth in McRO, Inc. v. Bandai Namco Games America Inc. (Fed. Cir. case number 15-1080, Sep. 13, 2016). In other words, the outcome of enabling procurements and requisitions using blockchain can be performed by many different types of rules and combinations of rules, and this disclosure includes various embodiments with specific rules. While the absence of complete preemption may not guarantee that a claim is eligible, the disclosure does not sufficiently preempt the field of procurement systems at all. The disclosure acts to narrow, confine, and otherwise tie down the disclosure so as not to cover the general abstract idea of just a procurement system. Significantly, other systems and methods exist for enabling procurement systems and processes, so it would be inappropriate to assert that the claimed invention preempts the field or monopolizes the basic tools of procurement. In other words, the disclosure will not prevent others from enabling procurement systems and processes, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include a graphical user interface for dynamically relocating/rescaling obscured textual information of an underlying window to become automatically viewable to the user (e.g., via a user terminal in procurement initiating system 110, client system 120, or supplier system 130). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., purchase requisition requests, purchase order notifications, procurement proof of purchases, procurement poof of payments, procurement records of payment, procurement payment confirmations, account balances, etc.) to prevent a computer or network from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   invoking, by at least one computing device of a plurality of computing devices in a permissioned blockchain network, a billing smart contract hosted in the permissioned blockchain network, the billing smart contract being invoked in response to receiving a purchase requisition request from a procurement initiating system;
   writing, by the billing smart contract, the purchase requisition request to the permissioned blockchain network based at least in part on a consensus agreement among the plurality of computing devices in the permissioned blockchain network;
   generating, by the billing smart contract, a purchase order based at least in part on the purchase requisition request received from the procurement initiating system, the purchase order being generated to comprise a hyperlink to access the purchase requisition request on the permissioned blockchain network;
   transmitting, by the billing smart contract, the purchase order to a client system, wherein in response to receiving the purchase order the client system is configured to transmit a procurement order to a supplier system, and wherein the supplier system is configured to transmit a procurement charge to a transaction processing system;
   receiving, by the billing smart contract, a proof of purchase from the supplier system;
   receiving, by the billing smart contract, a proof of payment from the transaction processing system;
   encrypting, by the billing smart contract using a zero-knowledge proof, the proof of purchase and the proof of payment; and
   writing, by the billing smart contract, the encrypted proof of purchase and the encrypted proof of payment to the permissioned blockchain network.

2. The method of claim 1, further comprising:
   generating, by the billing smart contract, a procurement billing notification; and
   transmitting, by the billing smart contract, the procurement billing notification to the client system, wherein in response to receiving the procurement billing notification the client system is configured to process a payment based at least in part on the procurement billing notification.

3. The method of claim 2, further comprising:
   receiving, by the billing smart contract, a procurement record of payment from the client system, wherein the procurement record of payment comprises proof of the payment based at least in part on the procurement billing notification; and
   writing, by the billing smart contract, the procurement record of payment to the permissioned blockchain network.

4. The method of claim 3, further comprising adjusting, by the billing smart contract, at least one of a client account balance or a supplier account balance on the permissioned blockchain network based at least in part on the procurement record of payment.

5. The method of claim 1, further comprising invoking, by the billing smart contract, a client smart contract, wherein in response to being invoked the client smart contract is configured to validate the proof of purchase and the proof of payment.

6. The method of claim 1, wherein in response to receiving the procurement charge the transaction processing system is configured to authorize the procurement charge and transmit a procurement charge authorization to the supplier system.

7. The method of claim 6, wherein the transaction processing system is configured to process the procurement charge and generate the proof of payment based at least in part on the processed procurement charge.

8. A computer-based system, comprising:
   a processor; and
   a tangible, non-transitory memory configured to communicate with the processor, the tangible, non-transitory memory having instructions stored thereon that, in response to execution by the processor, cause the processor to perform operations comprising:
   invoking, by the processor, a billing smart contract hosted in a permissioned blockchain network, the billing smart contract being invoked in response to receiving a purchase requisition request from a procurement initiating system;
   writing, by the processor, the purchase requisition request to the permissioned blockchain network based at least in part on a consensus agreement among a plurality of computing devices in the permissioned blockchain network;
   generating, by the processor, a purchase order based at least in part on the purchase requisition request received from the procurement initiating system, the purchase order being generated to comprise a hyperlink to access the purchase requisition request on the permissioned blockchain network;

transmitting, by the processor, the purchase order to a client system, wherein in response to receiving the purchase order the client system is configured to transmit a procurement order to a supplier system, and wherein the supplier system is configured to transmit a procurement charge to a transaction processing system;

receiving, by the processor, a proof of purchase from the supplier system;

receiving, by the processor, a proof of payment from the transaction processing system;

encrypting, by the processor using a zero-knowledge proof, the proof of purchase and the proof of payment; and writing, by the processor, the encrypted proof of purchase and the encrypted proof of payment to the permissioned blockchain network.

9. The system of claim 8, further comprising:

generating, by the processor, a procurement billing notification; and transmitting, by the processor, the procurement billing notification to the client system, wherein in response to receiving the procurement billing notification the client system is configured to process a payment based at least in part on the procurement billing notification.

10. The system of claim 9, further comprising:

receiving, by the processor, a procurement record of payment from the client system, wherein the procurement record of payment comprises proof of the payment based at least in part on the procurement billing notification; and writing, by the processor, the procurement record of payment to the permissioned blockchain network.

11. The system of claim 10, further comprising adjusting, by the processor, at least one of a client account balance or a supplier account balance on the permissioned blockchain network based at least in part on the procurement record of payment.

12. The system of claim 8, further comprising invoking, by the processor, a client smart contract, wherein in response to being invoked the client smart contract is configured to validate the proof of purchase and the proof of payment.

13. The system of claim 8, wherein in response to receiving the procurement charge the transaction processing system is configured to authorize the procurement charge and transmit a procurement charge authorization to the supplier system.

14. The system of claim 13, wherein the transaction processing system is configured to process the procurement charge and generate the proof of payment based at least in part on the processed procurement charge.

15. An article of manufacture including a non-transitory, tangible computer readable storage medium having instructions stored thereon that, in response to execution by a computer-based system, cause the computer based system to perform operations comprising:

invoking, by the computer-based system, a billing smart contract hosted in a permissioned blockchain network, the billing smart contract being invoked in response to receiving a purchase requisition request from a procurement initiating system;

writing, by the computer-based system, the purchase requisition request to the permissioned blockchain network based at least in part on a consensus agreement among a plurality of computing devices in the permissioned blockchain network;

generating, by the computer-based system, a purchase order based at least in part on the purchase requisition request received from the procurement initiating system, the purchase order being generated to comprise a hyperlink to access the purchase requisition request on the permissioned blockchain network;

transmitting, by the computer-based system, the purchase order to a client system, wherein in response to receiving the purchase order the client system is configured to transmit a procurement order to a supplier system, and wherein the supplier system is configured to transmit a procurement charge to a transaction processing system;

receiving, by the computer-based system, a proof of purchase from the supplier system;

receiving, by the computer-based system, a proof of payment from the transaction processing system;

encrypting, by the computer-based system using a zero-knowledge proof, the proof of purchase and the proof of payment; and writing, by the computer-based system, the encrypted proof of purchase and the encrypted proof of payment to the permissioned blockchain network.

16. The system of claim 15, further comprising:

generating, by the computer-based system, a procurement billing notification; and transmitting, by the computer-based system, the procurement billing notification to the client system, wherein in response to receiving the procurement billing notification the client system is configured to process a payment based at least in part on the procurement billing notification.

17. The system of claim 16, further comprising:

receiving, by the computer-based system, a procurement record of payment from the client system, wherein the procurement record of payment comprises proof of the payment based at least in part on the procurement billing notification; and writing, by the computer-based system, the procurement record of payment to the permissioned blockchain network.

18. The system of claim 17, further comprising adjusting, by the computer-based system, at least one of a client account balance or a supplier account balance on the permissioned blockchain network based at least in part on the procurement record of payment.

19. The system of claim 15, further comprising invoking, by the computer-based system, a client smart contract, wherein in response to being invoked the client smart contract is configured to validate the proof of purchase and the proof of payment.

20. The system of claim 15, wherein in response to receiving the procurement charge the transaction processing system is configured to authorize the procurement charge and transmit a procurement charge authorization to the supplier system.

* * * * *